(12) United States Patent
Stortoni (10) Patent No.: US 7,545,267 B2
(45) Date of Patent: Jun. 9, 2009

(54) ARRANGEMENT AND METHOD FOR PRODUCT INFORMATION INTERACTION WITH BUILDING CONTROL SYSTEM ELEMENTS

(75) Inventor: Fabrizio F. Stortoni, Gurnee, IL (US)

(73) Assignee: Siemens Building Technologies, Inc., Buffalo Grove, IL (US)

( * ) Notice: Subject to any disclaimer, the term of this patent is extended or adjusted under 35 U.S.C. 154(b) by 284 days.

(21) Appl. No.: 11/206,523

(22) Filed: Aug. 17, 2005

(65) Prior Publication Data

US 2006/0073794 A1    Apr. 6, 2006

Related U.S. Application Data

(60) Provisional application No. 60/611,031, filed on Sep. 17, 2004.

(51) Int. Cl.
G08B 1/08 (2006.01)
(52) U.S. Cl. .............................. 340/539.26; 340/539.1; 340/539.13; 340/539.27; 340/572.1
(58) Field of Classification Search ................. 340/501, 340/539.1, 539.26, 539.27, 539.13, 572.1
See application file for complete search history.

(56) References Cited

U.S. PATENT DOCUMENTS 4,958,502 A * 9/1990 Satoh et al. .................... 62/126
5,156,203 A * 10/1992 Funakoshi et al. ........... 165/207
5,969,606 A * 10/1999 Reber et al. .................. 340/540

(Continued)

FOREIGN PATENT DOCUMENTS

JP    2004-198043    *    7/2004

(Continued)

OTHER PUBLICATIONS

"Biodesign Institute to pioneer life-enhancing innovations." *The Tribune*. Dec. 15, 2004. Jan. 4, 2005. <http:www.smalltimesmedia.com/print_doc.cfm?doc_id=8503>. (2 pgs).

(Continued)

*Primary Examiner*—Daniel Wu
*Assistant Examiner*—Son M Tang (57) ABSTRACT

A first embodiment of the invention includes an arrangement for maintaining an environment for a movable object. The arrangement includes an information device, at least one RF device and a building system controller. The information device is disposed in a substantially fixed relationship with the movable object such that the memory element remains in the vicinity of the movable object when the movable object is moved. The information device includes a memory element and a first RF element, the memory element including at least one parameter having information identifying at least one threshold for an environmental condition. The first RF element is operably coupled to the memory element to receive the at least one parameter therefrom, and is operable to modulate a parameter signal containing the at least one parameter onto an RF signal for transmission. The second RF element is fixedly disposed in the vicinity of a structure, and is operable to receive the RF signal from the first RF element when the object is in the vicinity of the structure. The building control system controller is operably coupled to the second RF element to receive the at least one parameter from the RF signal, and is operable to alter at least one building control system output based at least in part on the at least one parameter.

12 Claims, 6 Drawing Sheets

U.S. PATENT DOCUMENTS

| | | | |
|---|---|---|---|
| 6,252,505 B1 * | 6/2001 | Bade | 340/540 |
| 6,285,282 B1 * | 9/2001 | Dorenbosch et al. | 340/540 |
| 6,294,997 B1 * | 9/2001 | Paratore et al. | 340/572.1 |
| 6,348,867 B1 * | 2/2002 | Myllymaki | 340/573.1 |
| 6,471,136 B1 | 10/2002 | Chatterjee et al. | 237/28 |
| 6,480,699 B1 | 11/2002 | Lovoi | 455/558 |
| 6,501,390 B1 * | 12/2002 | Chainer et al. | 340/870.16 |
| 6,561,040 B1 | 5/2003 | Henderson et al. | 73/777 |
| 6,820,801 B2 * | 11/2004 | Kaneko et al. | 235/375 |
| 6,927,687 B2 * | 8/2005 | Carrender | 340/539.26 |
| 6,953,919 B2 * | 10/2005 | Clothier | 219/620 |
| 6,982,640 B2 * | 1/2006 | Lindsay et al. | 340/540 |
| 7,082,344 B2 * | 7/2006 | Ghaffari | 700/115 |
| 7,271,719 B2 * | 9/2007 | Ku et al. | 340/539.26 |
| 7,301,439 B2 * | 11/2007 | Hashimoto et al. | 340/10.51 |
| 2002/0151816 A1 | 10/2002 | Rich et al. | 600/547 |

FOREIGN PATENT DOCUMENTS

| | | | |
|---|---|---|---|
| JP | 02005096963 | * | 4/2005 |

OTHER PUBLICATIONS

Brody, Aaron L. "What's Active about Intelligent Packaging." *Products & Technologies*. 55.6. Jun. 2001. (pp. 75-78).

Fletcher, Anthony. "RFID-enabled cold chain monitoring to cut costs." NUTRAingredients.com!europe. Nov. 10, 2004. Jan. 4, 2005. <http://www.nutraingredients.com/new/printNewsBis.asp?id=55999.html>. (2 pgs).

\* cited by examiner

ARRANGEMENT AND METHOD FOR PRODUCT INFORMATION INTERACTION WITH BUILDING CONTROL SYSTEM ELEMENTS

This application claims the benefit of U.S. Provisional Patent Application Ser. No. 60/611,031, filed Sep. 17, 2004, which is incorporated by reference in its entirety herein.

FIELD OF THE INVENTION

The present invention relates generally to products or assets, and more particularly, to products and/or assets that are at least temporarily stored in building structures.

BACKGROUND OF THE INVENTION

Products in commerce typically travel from a place of origin to a temporary or final destination. The logistical operation defining the travel modes and travel time is often referred to as a supply chain. For example, fresh produce travels from a point of origin in which it is harvested to a point of retail sale such as a grocery market. Pharmaceuticals travel from a point of manufacture to pharmacy shelves or health care facilities. Electronic devices travel from points of manufacture to individual consumer electronic dealers. Supply chains often involve various types of travel and multiple warehouse storage facilities. An automobile, for example, may be manufactured, stored briefly at the assembly plant, shipped by rail to a dock, shipped overseas to a warehouse facility, shipped by rail or truck again to a retail dealer, and then stored on the dealer lot.

Supply chains often involve travel through, or storage in, a variety of climates. In some cases, products are relatively hardy and only require a minimum amount of protection against climate extremes. Other products, however, require maintenance of shipping climate conditions. For example, fresh food stuffs require maintenance of conditions that do not encourage spoilage, such as high temperature and humidity. Some pharmaceuticals may require refrigeration at all times.

While efforts are made to ensure that products in a supply chain are protected from environmental conditions that will result in their deterioration, the complexity of some supply chains makes it difficult to ensure compliance with product requirements. As a result, even with a reasonable amount of planning, at least some percentage of products are effectively destroyed (i.e. rendered ineffective, unhealthy or inedible) due to adverse environmental conditions in the supply chain.

Efforts have been made to provide tracking of exposure to environmental extremes during the supply chain. One such effort is the use of labels on product shipping containers that have a feature that undergoes a permanent alteration if the product is exposed to temperature extremes for more than a minimal amount of time. More sophisticated "smart labels" have been proposed that use microelectromechanical sensors to sense one or more conditions and store condition information in memory on the smart label itself.

The labels that track environmental conditions provide two advantages that improve supply chain operation. First, the labels provide accountability at each link in the supply chain, thereby increasing the care that is taken at each link. Second, the labels allow for immediate identification of potentially bad product, which may be disposed of before the product is purchased and used, possibly causing harm.

At least one disadvantage of the above described environment tracking labels is that ultimately they cannot prevent poor environmental conditions. Moreover, the accountability created by the labels may result in overcompensation for environmental conditions (e.g. over-cooling) to avoid damage, which can be inefficient.

As a consequence, there is a need for system and method that can alleviate product damage during supply chain operations. There is a further need to alleviate product damage without implementing inefficient practices.

SUMMARY OF THE INVENTION

The present invention addresses one or more of the above needs, as well as others, by providing product information devices that communicate with a building control system that can alter the environment in which the product is stored. The product information devices may, for example, be labels or small wireless modules that incorporate microelectromechanical ("MEMs") sensor devices and RF devices. These product information devices communicate condition information or at least environmental limit information to the building control system, which then undertakes to alter the environment in which the products are stored. Because the actual conditions (temperature, humidity, etc.) can be measured and compared to product requirements, the building control system can ensure that conditions are adequate without over-compensation.

A first embodiment of the invention includes an arrangement for maintaining an environment for a movable object. The arrangement includes an information device, at least one RF device and a building system controller. The information device is disposed in a substantially fixed relationship with the movable object such that the memory element remains in the vicinity of the movable object when the movable object is moved. The information device includes a memory element and a first RF element, the memory element including at least one parameter having information identifying at least one threshold for an environmental condition. The first RF element is operably coupled to the memory element to receive the at least one parameter therefrom, and is operable to modulate a parameter signal containing the at least one parameter onto an RF signal for transmission. The second RF element is fixedly disposed in the vicinity of a structure, and is operable to receive the RF signal from the first RF element when the object is in the vicinity of the structure. The building control system controller is operably coupled to the second RF element to receive the at least one parameter from the RF signal, and is operable to alter at least one building control system output based at least in part on the at least one parameter.

The above described features and advantages, as well as others, will become more readily apparent to those of ordinary skill in the art by reference to the following detailed description and accompanying drawings.

DETAILED DESCRIPTION

Figure 1:
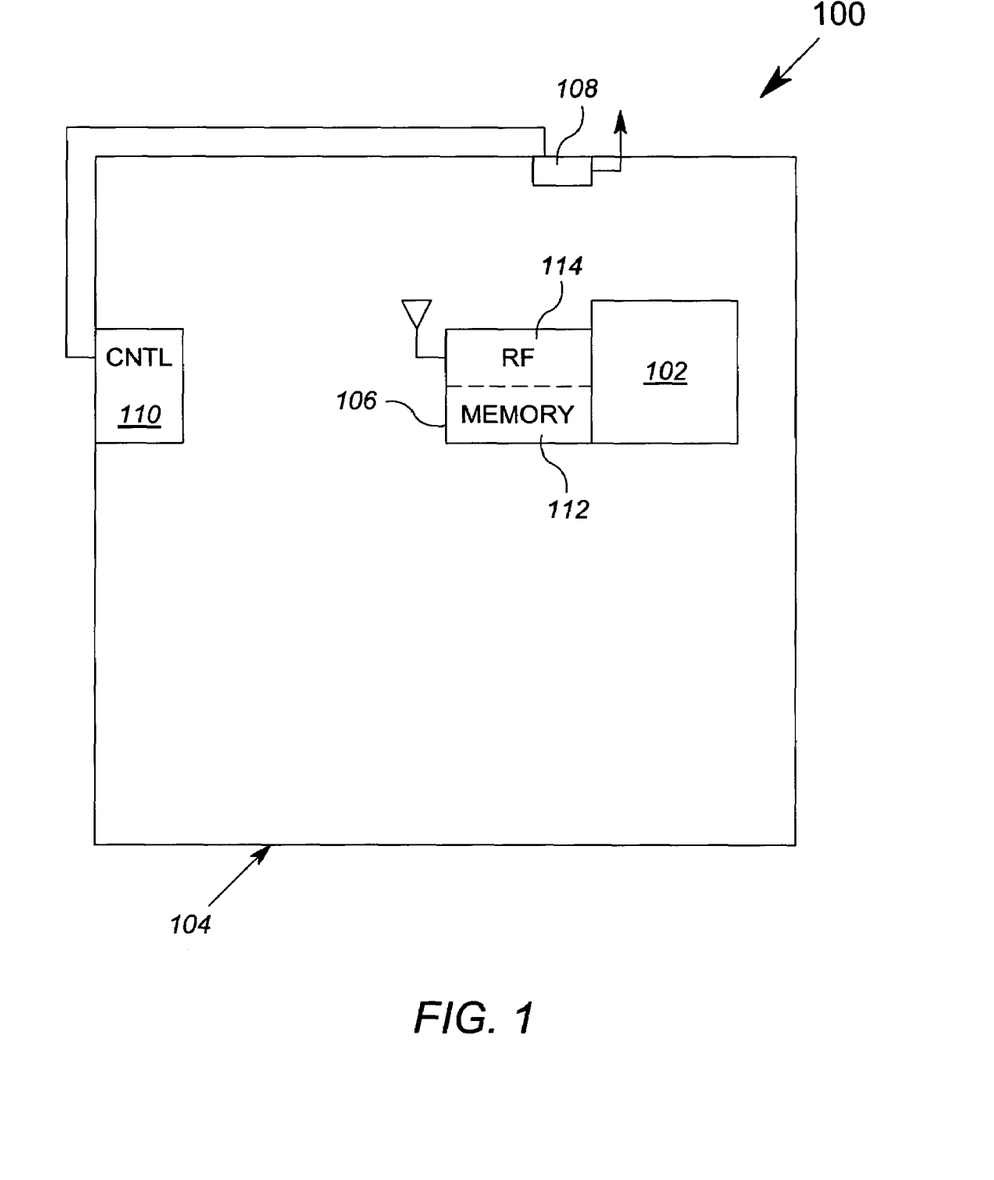
FIG. 1 shows a block diagram of an exemplary arrangement for affecting an environment for a movable object according to embodiments of the invention.

FIG. 1 shows a block diagram of an exemplary an arrangement 100 for affecting an environment for a movable object 102 according to embodiments of the invention. As shown in FIG. 1, the movable object 102 is disposed within a facility 104. The facility 104 in the exemplary embodiment is a storage facility, such as a warehouse. However, the facility 104 may alternatively be any other facility in which a movable object may be stored, including but not limited to a storage area or holding area of a factory, commercial building, retail establishment, multi-family residence, etc., or even an outdoor storage area, ship or rail conveyance. The arrangement 100 includes an information device 106, a facility RF element 108 and a building control system controller 110.

The information device 106 is fixedly disposed in the vicinity of the movable object 102, such that at least during shipment of the movable object 102, the information device 106 generally moves with the movable object 102. The information device 106 may suitably be affixed to the movable 102 object itself, packaging for the movable object 102, a shipping container in which the movable object 102 is contained, or a shipping pallet on which the movable object 102 is secured.

The facility RF element 108 is fixedly supported in, on or near the structure of facility 104, and does not generally move with the movable object 102. For example, the facility RF element 108 may be affixed to a wall, ceiling, support beam, floor, or other structural element of the facility 104, or may be on a permanent structure within the facility such as a light fixture, ventilation opening, machinery or the like.

The building control system controller 110 is preferably a part of the building control system that controls the environment of the facility 104, and may suitably constitute a portion of the HVAC system of the facility 104. The building control system controller 110 is operably configured to control, directly or indirectly, elements of the HVAC system, not shown, that can be controlled to alter the environmental conditions such as temperature and humidity within one or more areas of the facility 104.

The building control system controller 110 may suitably be any HVAC controller or the like, such as those located in a RAPTOR™ or APOGEE™ Field Panel controller available from Siemens Building Technologies, Inc. which is configured to have the capabilities described herein. Such controllers are operable to generate process outputs that can be used to drive actuators of ventilation dampers, control heating or chilling equipment, adjust fan speeds, control humidifiers or dehumidifiers and the like.

The information device 106 includes a memory element 112 and an RF element 114. The memory element 112 includes at least one parameter including information identifying at least one threshold for an environmental condition relating to the movable object 102. For example, the memory element 112 may include a parameter defining a maximum temperature to which the movable object 102 should be exposed, and/or a maximum humidity in which the movable object 102 should be stored. The threshold(s) stored in the memory element 112 may of course also be a minimum value for an environmental condition. In accordance with some embodiments of the invention, the memory element 112 may suitably store several other things, such as an expiration date for the movable object 102, or information regarding prior times in which the movable object 102 was exposed to conditions outside its threshold(s).

The RF element 114 of the information device is preferably operably coupled to the memory element 112 to exchange information therewith. In the embodiment of FIG. 1, the RF element 114 is coupled to receive the parameter(s) from the memory element 112 and transmit the parameter information in an RF signal. Thus, the RF element 114 is operable to modulate parameter data onto an RF carrier signal that is transmitted. The RF element 114 may suitably be a battery powered, local RF signal transmitter that uses Bluetooth or other close range RF communication schemes. The RF element 114 may alternatively be an RFID device that derives transmission power from a received RF signal. In either event the RF element 114 is configured to transmit parameter information from the memory element 112 to local receivers.

One such local receiver is the facility RF element 108. The facility RF element 108 is configured to receive RF signals including parameter information from RF elements of information devices such as the information device 106. More specifically, facility RF element 108 is configured to receive the RF signal from the RF element 114 when the movable object 102 is in the vicinity of the structure 104, and preferably, within the vicinity of the facility RF element 108.

The building control system controller 110 is configured in the embodiment described herein to receive the parameter information from the information device 106 via the RF elements 114 and 108, and alter at least one building control system output based at least in part on the at least one parameter.

In an exemplary operation, the movable object 102 is moved to the facility 104 and placed in the vicinity of the facility RF element 108. The facility RF element 108 periodically polls for the presence of new information devices such as the information device 106. The RF device 114 receives the polling signal, and generates a responsive signal indicating that it is the first contact between the information device 106 and the facility RF element 108. To this end, the information device 106 may suitably also include logic circuitry, (not shown in FIG. 1), capable of generating a response to the polling signal, which may be in the form of microprocessor or microcontroller or other programmable device.

In any event, the RF device 114 reads out the one or more parameters from the memory device 112, and then modulates an RF signal with the parameter information. The facility RF device receives the RF signal and obtains the parameter(s) therefrom. As discussed above, the parameters may suitably include those that identify a temperature above or below which the movable object 102 should not be stored or to which the movable object 102 should not otherwise be exposed. Parameters may include multiple thresholds, each corresponding to a different maximum time a particular condition may exceed the threshold. For example, a particular item may have a first threshold of 70° F. which may be exceeded for a maximum of two hours and a second threshold of 80° F. which may be exceeded for a maximum for 30 minutes.

Figure 3:
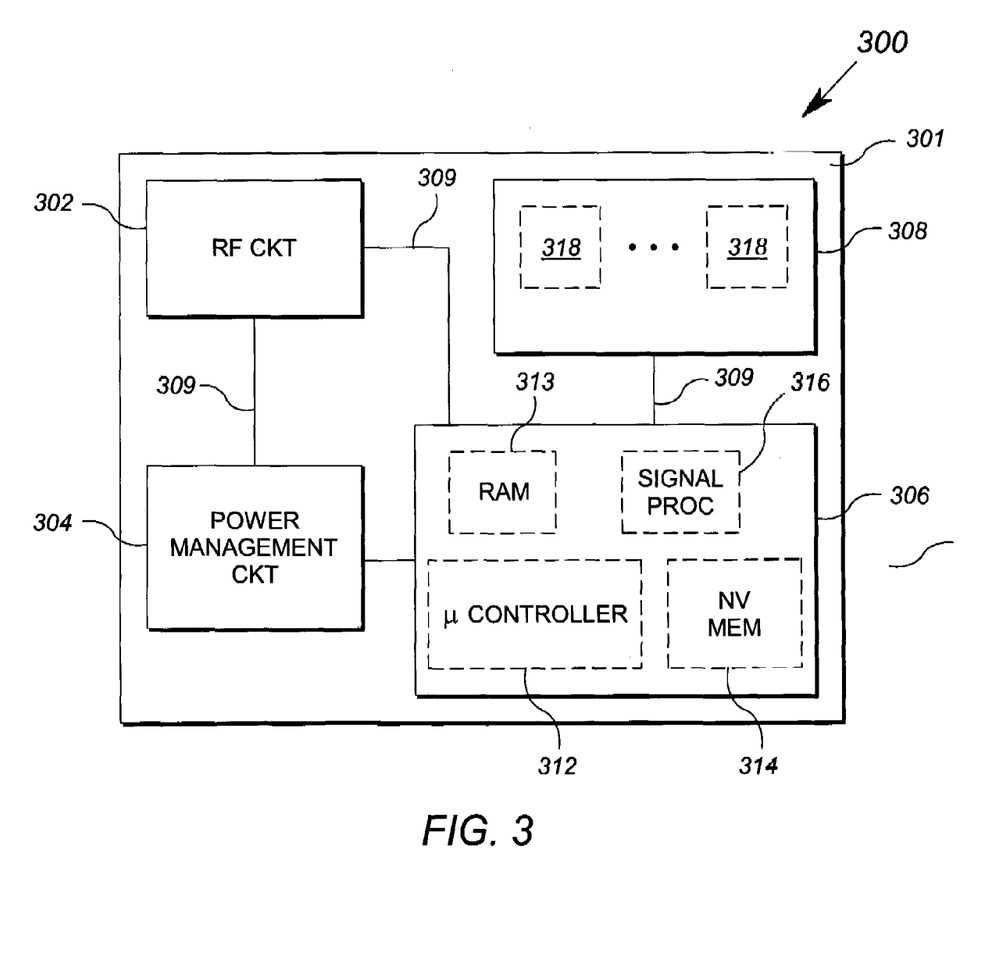
FIG. 3 shows a schematic block diagram of an exemplary information device that may be used in the arrangement of FIG. 1.

The facility RF device 108 passes the parameter information to the building control system controller 110, which then uses the information in determining one or more control outputs of the HVAC system, not shown. For example, if the parameter identified that the movable object 102 has a maximum exposure threshold temperature of 50 degrees, then the building control system controller 110 would generate control outputs that attempt to maintain the temperature at no more than 50 degrees. In this embodiment, the building control system controller 110 receives information on the sensed temperature in the vicinity of the movable object 102 from ordinary HVAC temperature sensors, not shown. However, in alternative embodiment, the controller 110 may receive temperature related information from sensors that are embedded in the information device 106 itself, which are also communicated via the RF element 114 to the facility RF element 108 from time to time. Thus, in some embodiments, the information device 106 is capable of providing both environmental parameter information relating to the movable object 102 as well as actual environmental sensor readings from the vicinity of the movable object 102. FIG. 3 describes an information device of this type.

According to one aspect of an embodiment of the invention, the controller 110 uses the parameter received from the movable object 102 (and others like it) to improve energy efficiency in the facility 104. For example, the controller 110 may receive temperature parameter information from a plurality of information devices (see FIG. 2) corresponding to a plurality of movable objects, and provide practically no more heating or cooling than is necessarily to ensure that the temperature is within an acceptable range for the parameters of all of those movable objects. In a more detailed example, consider a situation in which the parameters of a number of movable objects such as the movable object 106 require a maximum exposure temperature of not more that 50°. In such a case, the controller 110 attempts to keep the temperature of the facility 104 at approximately 48°-49° in that area. By contrast, a prior art HVAC system may simply maintain a standard refrigerated storage facility having a temperature at a safely low temperature of 40°, because the individual needs of the movable objects are not known. With the above described feature, the controller may be more efficient by cooling the movable objects only to the extent necessary to avoid out-of-boundary conditions for the specific objects located in a controllable portion of the facility 104 at any one time.

The above described embodiment may be used in other ways to improve the storage of the movable object 106. For example, if the facility 104 has localized cool spots and warm spots, the controller 110 may be able to use this information to suggest moving certain movable objects 106 away from or into particular cool or warm spots. To this end, the building control system controller 110 is preferably connected directly or indirectly to a user interface, not shown, of the BCS system.

Figure 2:
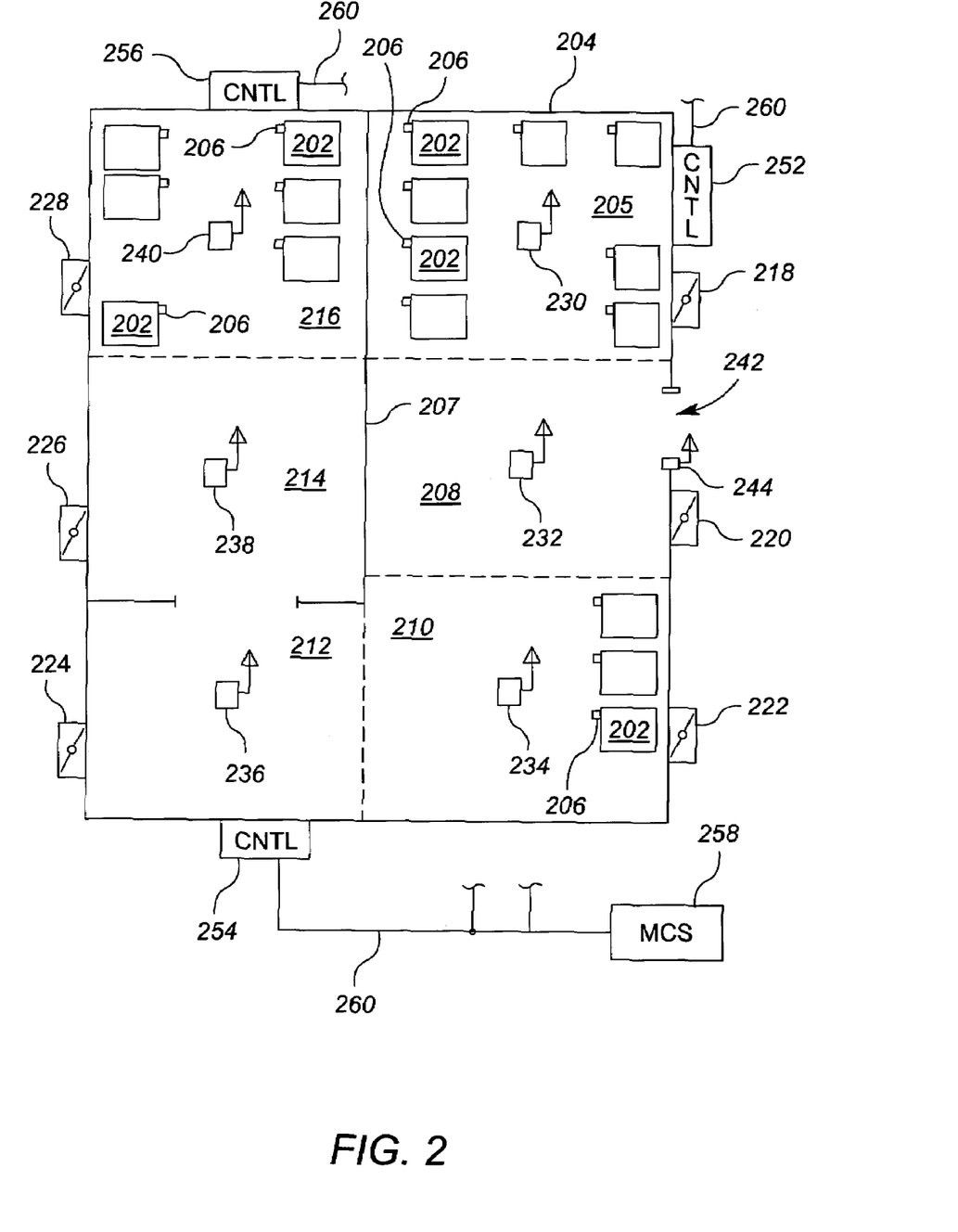
FIG. 2 shows a representative block diagram of one exemplary embodiment of the arrangement of FIG. 1 in further detail.

FIG. 2 shows in further detail one exemplary embodiment of the arrangement 100 of FIG. 1. In FIG. 2, a plurality of movable objects 202 are disposed within the facility 204. Each movable object 202 includes an information device 206 operable to communicate information with the building control system of the facility 204. The movable objects 202 may suitably include different types of objects. For example, if the movable objects are pharmaceuticals, then there may be various types of pharmaceuticals disposed within the facility 204. The information device 206 is described in detail further below. Each movable object 202 may suitably represent a plurality of products grouped together for shipment purposes, such as a pallet or carton of products.

The facility 204 is roughly divided into six zones 205, 208, 210, 212, 214 and 216. Two zones 214 and 216 are separated by a wall 207 from the other zones 205, 208, 210 and 212. Associated with each zone 205, 208, 210, 212, 214 and 216 is at least one ventilation damper 218, 220, 222, 224, 226 and 228 of the HVAC/refrigeration system and at least one facility RF unit 230, 232, 234, 236, 238 and 240. The facility 204 includes a point of entry 242 through which the movable objects 202 may enter and exit the facility 204. An entry RF unit 244 is disposed proximate to the entry 242.

It will be appreciated that the layout of the facility 204 is given by way of illustrative example, and that the present invention is applicable to facilities of various sizes and layouts. Moreover, it is not necessary to define a zone corresponding to each ventilation dampers. Zones may be associated with multiple ventilation dampers, or vice versa. In some cases, a zone may be an entire room.

As with the generalized embodiment of FIG. 1, the information devices 206 of FIG. 2 cooperate with elements of the building automation system of the facility 204 to help ensure the integrity of the environmental conditions to which product is exposed, and/or the shelf-life of the product. To this end, the information devices 206 may suitably take the form of the exemplary sensor module shown in FIG. 3.

Referring to FIG. 3, the sensor module 300 is preferably embodied as a wireless integrated network sensor that incorporates microelectromechanical system ("MEMS") technology. By way of example, in the exemplary embodiment described herein, the sensor module 300 includes an RF circuit 302, a power management module 304, a processing circuit 306, and a MEMS-based sensor element 308. In a preferred embodiment, many or most elements of the RF circuit 302 are also formed using MEMS or MEMS-like technology. The module 300 includes a silicon substrate 301 which supports each of the elements 302, 304, 306 and 308. As will be discussed below, the MEMs elements that require non-silicon substrates may be supported on the silicon substrate 301 using flip chip bonding techniques. It is advantageous to have most or all of the elements 302, 304, 306 and 308 supported on a single silicon substrate because it reduces power requirements and reduces the footprint of the sensor module 300. However, at least some advantages of the invention may be obtained even if only some of the elements are incorporated onto a single substrate, such as the sensor module 308 and processing circuit 306.

It will be appreciated that in the present embodiment, the elements 302, 304, 306 and 308 may all be connected using conductive interconnects 309 that are formed on the semiconductor substrate 301. Such conductive interconnects 309 may suitably be metallic interconnects or traces and/or polysilicon conductors, that are formed on the substrate 301 using known techniques.

In general, the RF circuit 302 is operable to communicate using local wireless communication protocols such as Bluetooth, or other short-range wireless protocols. In the embodiment described herein, the RF circuit 302 is operable to communicate data signals to and from a wireless transponder such as the facility RF units 230, 232, 234, 236, 238 and 240 of FIG. 2. The RF circuit 302 is operably connected to receive bias power and transmission power from the power management module 304. The RF circuit 302 is further operable to process received RF signals and provide digital signals to the processing circuit 306, and to receive digital signals from the processing circuit 306 and generate transmission RF signals therefrom.

The power management circuit 304 in the embodiment described herein includes a lithium ion rechargeable battery, and may suitably include a trickle charger. The trickle charger may suitably be coupled to the RF circuit 302 such that the trickle charger can harvest energy from received RF signals. Circuits capable of providing these functions are known in the art. Regardless, the battery preferably formed on the substrate 301, or at least connected thereto via flip chip techniques. Lithium ion batteries are particularly advantageous because they have a charge life that can be extensive (i.e. several weeks), and possibly longer with good energy conservation techniques.

The MEMS sensor element 308 includes at least one MEMS sensor 318, which may suitably be a temperature sensor, flow sensor, pressure sensor, and/or gas-specific sensor. MEMS devices capable of obtaining temperature, flow, pressure and gas content readings have been developed and are known in the art. In one embodiment, several sensors are incorporated into a single device as a sensor suite 318. Such devices are described, for example, Neil W. Bergmann, "Interfacing Requirements for MEMS Components in System-On-Chip Methodologies", (School of Computer Science and Electrical Engineering, the University of Queensland, available online at www.itee.uq.edu.au), which is incorporated herein by reference. Another exemplary construction of multiple MEMS sensors on a single silicon substrate is shown and described in U.S. Pat. No. 6,471,853 to Moscaritolo, issued Oct. 29, 2002, which is incorporated herein by reference.

Upon installation, the sensor module 300 may be programmed to enable the particular sensing capability. By incorporating different, selectable sensor capabilities, a single sensor module design may be manufactured for use in a large majority of environmental sensing applications, and possibly some other applications. The single sensor module design is preferable because it allows mass production of a single (or few) designs for all products, thereby reducing costs. In the embodiment of FIG. 3, the sensor module 300 may suitably be configured to enable its temperature sensing function.

The processing circuit 306 of the embodiment described herein includes a microcontroller 312, a programmable non-volatile memory 314 and a signal processing circuit 316. The processing circuit 306 also preferably includes random access memory 313 that stores various run-time values for the microcontroller 312, as well as program instructions being executed by the microcontroller 312.

The signal processing circuit 316 includes the circuitry that interfaces with the sensor element 308, converts analog sensor signals to digital signals, and provides the digital signals to the microcontroller 312.

The programmable non-volatile memory 314, which may be embodied as a flash programmable EEPROM, stores configuration information for the sensor module 300. By way of example, programmable non-volatile memory 314 preferably includes system identification information, which is used to associate the information generated by the sensor module 300 with its physical and/or logical location in the building control system. For example, the programmable non-volatile memory 314 may contain an "address" or "ID" of the sensor module 300 that is appended to any communications generated by the sensor module 300.

In particular, the programmable non-volatile memory 314 contains a data file that lists its ID, minimum and/or maximum environmental thresholds, time limits for thresholds, an expiration date, if any, and may include point of origin and point of destination. The data file is preferably in a standardized format shared by all information devices 206. By way of example, the data file may be an XML, such as that shown below.

```
<shipID>R4534DDM</shipID>
<prodtype>orange</prodtype>
```

-continued

```
<maxtempF>90</maxtempF>
<mintempF>32</mintempF>
<sensoractive>temp</sensoractive>
<expdate>15.12.06</expdate>
<origin>01484</origin>
<destination>46204</destination>
```

Another data file of the memory 314 of another product that is sensitive to humidity may have the following data file:

```
<shipID>R4538DDM</shipID>
<prodtype>cigar</prodtype>
<maxhumid>95</maxhumid>
<minhumid>60</minhumid>
<sensoractive>temp</sensoractive>
<sensoractive>hum</sensoractive>
<origin>01484</origin>
<destination>46204</destination>
```

The XML "types" or fields would be standardized, and only those applicable to corresponding movable objects need be included in the file. It will be appreciated that various other data structures or formats may be used while still obtaining many of the advantages of this embodiment of the invention.

As shown in the above examples, the memory 314 further includes set-up configuration information related to the type of sensor being used. As discussed above, in this example, the sensor element 308 is preferably implemented as a suite of sensor devices 318. Thus the data file in the memory 314 includes the information that identifies which sensor functionality is enabled. In the examples above, <sensoractive> field identifies each sensor that is activated on the sensor module 300. The memory 314 may further include calibration information regarding the sensor, and system RF communication parameters employed by the microcontroller 312 and/or RF communication circuit 302 to transmit information to other devices.

The microcontroller 312 is a processing circuit operable to control the general operation of the sensor module 300. In general, however, the microcontroller 312 receives digital sensor information from the signal processing circuit 316 and provides the information to the RF communication circuit 302 for transmission to a local device, for example, one of facility RF units 230, 232, 234, 236, 238, 240 and 244. The microcontroller 312 may cause the transmission of sensor data from time-to-time as dictated by an internal counter or clock, or in response to a request received from the hub module 302.

The microcontroller 312 is further operable to receive configuration information via the RF communication circuit 302, store configuration information in the memory 314, and perform operations in accordance with such configuration information. The configuration may include a local ID or point ID for the building control system of the facility 204, and may define communication channels to be used for further communications.

The microcontroller 312 also causes the appropriate sensor device or devices from the sensor device suite 318 to be operably connected to the signal processing circuit such that sensed signals from the appropriate sensor device are digitized and provided to the microcontroller 312. The microcontroller 312 may process and store the sensed signal information locally, and/or communicate the information via the RF communication circuit 302. As discussed above, the microcontroller 312 may also use the configuration information to format outgoing messages and/or control operation of the RF communication circuit 302.

As discussed above, the RF communication circuit 302 may suitably include a Bluetooth RF modem, or some other type of short range (about 30-100 feet) RF communication modem. The use of a MEMS based RF communication circuit as the communication circuit 302, which are known in the art, allows for reduced power consumption, thereby enabling the potential use of a true wireless, battery operated sensor module 300.

As discussed above, it will be assumed that in an exemplary embodiment, the sensor module 300 is configured to operate as a temperature sensor. As also discussed above, the configuration information identifying the selected temperature sensing function is stored in the memory 314. To this end, such information may be programmed into the memory 314 via a wireless programmer. For example, the sensor module 300 may be programmed upon shipment from the point of origin.

In any event, the microcontroller 312, responsive to the configuration information, causes the signal processing circuit 316 to process signals only from the temperature sensor, ignoring output from any other sensors of the sensor suite 318. Such operation helps reduce power consumption by eliminating unnecessary functions. However, it will be appreciated that if sufficient power is available, it may not be necessary to disable the processing of other sensor information.

It will further be appreciated that in other embodiments, the sensor suite 318 may be replaced by a single sensor. However, additional advantages may be realized through the use of a configurable sensor module capable of performing any of a plurality of sensor functions. As discussed further above, these advantages include the reduction of the number of sensor module designs.

Referring again to FIG. 2, the facility RF units 230, 232, 234, 236, 238 and 240 are each operably coupled to one of a set of controller panels (sometimes known in the art as field panels) 252, 254 and 256. The control panels 252, 254 and 256 are preferably configured to generate control outputs based on sensor data and/or set point data. In particular, the control panels 252, 254 and 256 are preferably configured to receive sensor data and set point information from one or more HVAC devices, and to generate control outputs for equipment, as well as other outputs for statistical trending and alarm functions. Such control panels are known in the art may suitably have the general structure of a commercially available field panel such as the RAPTOR™ or one of the APOGEE™ Field Panel controllers which are programmable and are available from Siemens Building Technologies, Inc. of Buffalo Grove, Ill. In accordance with the present invention, the field panels 252, 254 and 256 preferably a part of a larger HVAC or building control system that controls the basic environment of the facility 204. The HVAC system typically includes various components known in the art, but not shown, including chiller plants, heating plants, blowers, ducts temperature and humidity sensors, and possibly lighting sensors and controls. The HVAC system may include humidifiers or dehumidifiers as well. The HVAC system also includes ventilation dampers 218, 220, 222, 224, 226 and 228, which are shown in FIG. 2.

The HVAC system in general operates to regulate and monitor the environment of the facility 204 by, among other things, providing additional warm or cool air as needed to maintain a desired temperature or humidity. The embodiment described in connection with FIG. 2 is intended to be compatible with preexisting HVAC system infrastructure. To this end, the ventilation damper 218, 220, 222, 224, 226 and 228 and the control panels 252, 254 and 256 represent existing HVAC hardware. However, it will be noted that the control panels 252, 254, and 256 in this embodiment are also programmed or configured in a novel manner to carry out the operations described herein. Those of ordinary skill in the art will be able to program or configure a field panel to carry out the functions of the control panels 252, 254 and 256 based on the disclosure herein. Some existing field panel architectures currently have sufficient flexibility to be programmed to carry out many of the operations described herein, such as a RAPTOR™ controller, referenced above. Other field panels, such as a PREDATOR™ or TEC™ field panel available from Siemens Building Technologies, Inc. may require some modification to carry out the functions. A control panel operable to perform the operations described herein may be implemented by a suitable modification of a traditional field panel design. In some embodiments, the master control station 258, for example, a TALON™ Network Manager or INSIGHT™ workstation, may carry out many of the operations that a currently existing field panel could not be readily programmed to execute.

In any event, to program the field panel (or master control station), control parameters are created within the HVAC system for each zone 205, 208, 210, 212, 214, and 216 based on obtained parameter data from the information devices 206. These control parameters received from the movable object information devices 206 would be used as limits to a standard control program for HVAC systems. The standard control program would maintain control over the environment based on the control program and the limits currently communicated from the moveable objects 202 within the controlled space. If no moveable objects are within the controlled space of the HVAC system then the system would control the operations of the system using the ordinary HVAC control parameters of the system building.

Figure 6:
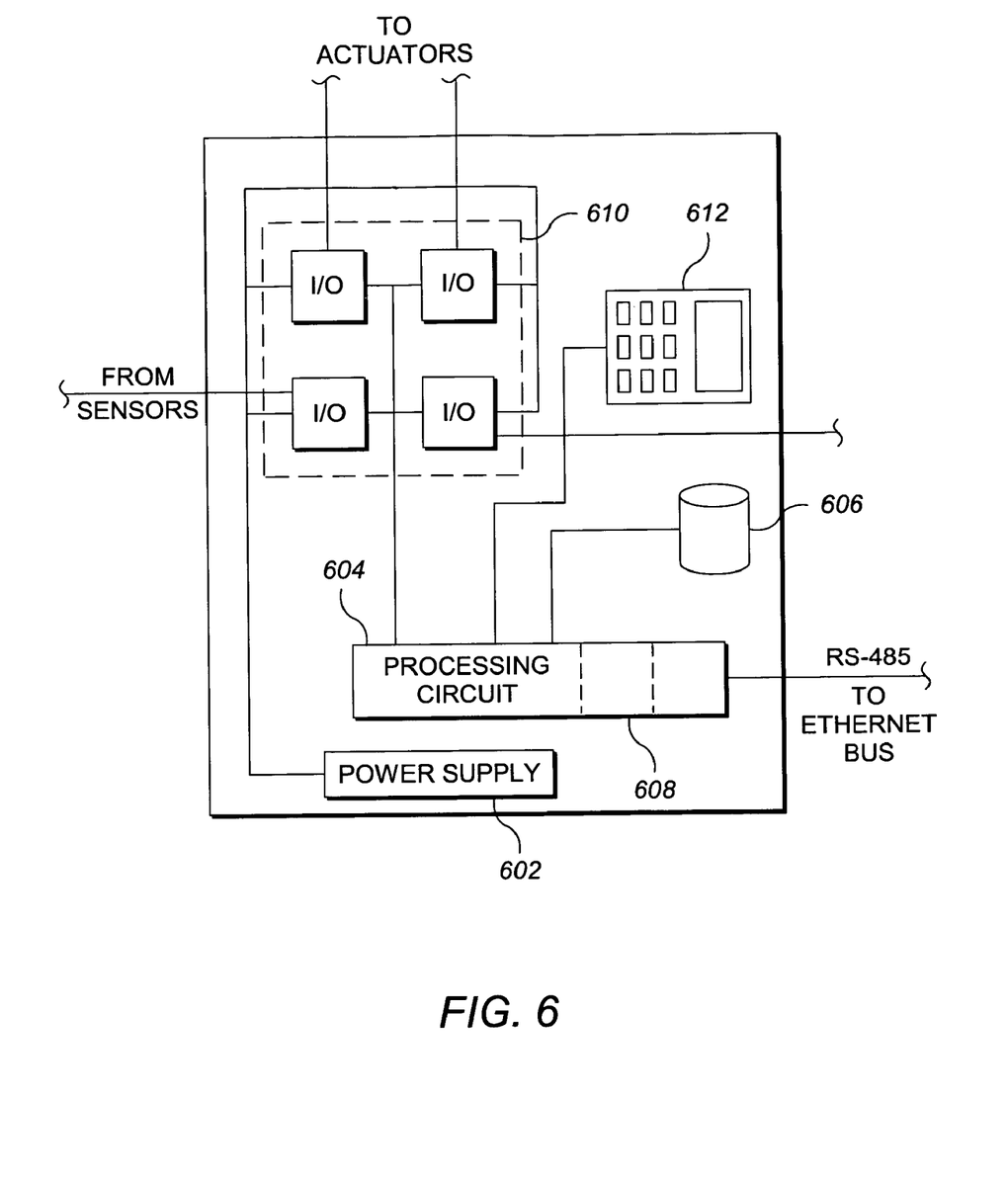
FIG. 6 shows a block diagram of an exemplary control panel of a building control system that may be used in the exemplary arrangement of FIG. 2.

A block diagram of a typical control panel 600 that may be used as the control panels 252, 254 or 256 is shown in FIG. 6. It will be appreciated that specific implementations of control panels will vary from system to system. However, the present invention may be implemented on any control panel that includes a controller that is operable to either generate actuator control outputs, receives sensor inputs, and/or communicate with other control panels or systems.

Referring to FIG. 6, the control panel 600 includes a power supply 602, a processing circuit 604, a data store 606, an Ethernet communication circuit 608, and an I/O circuit 610. The control panel 600 operates as a building system controller, as do other devices such as the control station 258.

The power supply 602 is a circuit that is operable to convert AC utility power to AC and DC voltages used within the control panel 600. Such devices are well known in the field panel art. The processing circuit 604 is a circuit that is capable of carrying out a set of instructions to implement the logical operations ascribed to the control panels herein. To this end, the processing circuit 604 may suitably include a microprocessor, a microcontroller, discrete digital circuitry, a programmable logic device, and/or other processing elements, as well as related interface, clocking, and memory circuitry. Suitable circuits in various configurations would be known in the art.

The data store 606 is a memory device or set of memory devices to store information on the points or building control system elements that are associated with the control panel 600. In particular, each control panel 600 maintains and/or monitors a subset of elements in the building control system, such as one or more ventilation dampers, temperature sensors, blowers or the like. The control panel 600 is typically capable to perform control operations on such elements, and also represents a conduit through which communication with such elements may be effected. The data memory 606 contains the data for these elements or points. The memory 606 also has the capacity to retain global data shared by all of the control panels in the building control system. Some control panels or field panels may include a hard disk or other non-volatile storage devices, while others only include random access memory or other volatile storage elements.

The communication circuit 608 is a circuit that is operable to provide signals to and receive signals from a network bus connection using appropriate physical, transport and network layer protocols. In one embodiment, the communication circuit 608 is operable to use Ethernet physical communications protocols. The physical connection to the network bus may suitably be an RS-485 standard connection. The communication circuit 208 also preferably includes the TCP/IP transport and network layer functionality that permits the exchange of information on a logical IP network. It is noted that some of the communication circuit and processing circuit operations may be carried out by one or more shared devices. The communication circuit 208 may also include local wireless communication circuits that allow wireless communications with RF units such as the RF units 230, 232 etc. of FIG. 2.

It will be appreciated that the block diagrams of functional blocks of FIG. 6 are largely depicted along functional lines, and that occasionally portions of the same circuit elements may perform portions of multiple functions. For example, as indicated above, the processing elements of the processing circuit 604 may provide at least some of the functionality required to effect the transport and network layer communication functions of the communication circuit 608.

The I/O circuits 610 are ordinary I/O interface devices used to receive signals from various building control devices, and provide signals to various control devices. The I/O circuits 610 may have many configurations, and may include analog signal transceivers as well as digital communication circuit transceivers. Referring to FIG. 2, the I/O circuits 610 can include circuits that communicate with the actuators for one or more of the ventilation dampers 218, 220, etc. The I/O circuits 610 would also be connected to receive sensor signal from sensors of the building control system.

The control panel 610 also includes an optional user interface 612, which may be relatively basic, such as a pushbutton keypad and a small LCD display panel. The user interface 612 allows for a user to locally access data in the data store 606. Instead of a user interface 612, or in addition to it, the field panel 610 may include an interface circuit, not shown, that may be connected to a laptop computer or other portable computing device. The field panel may also include a local wireless connection, such as Bluetooth, through which a user may access data via a portable computing device. Such connections are known in the art.

Figure 4:
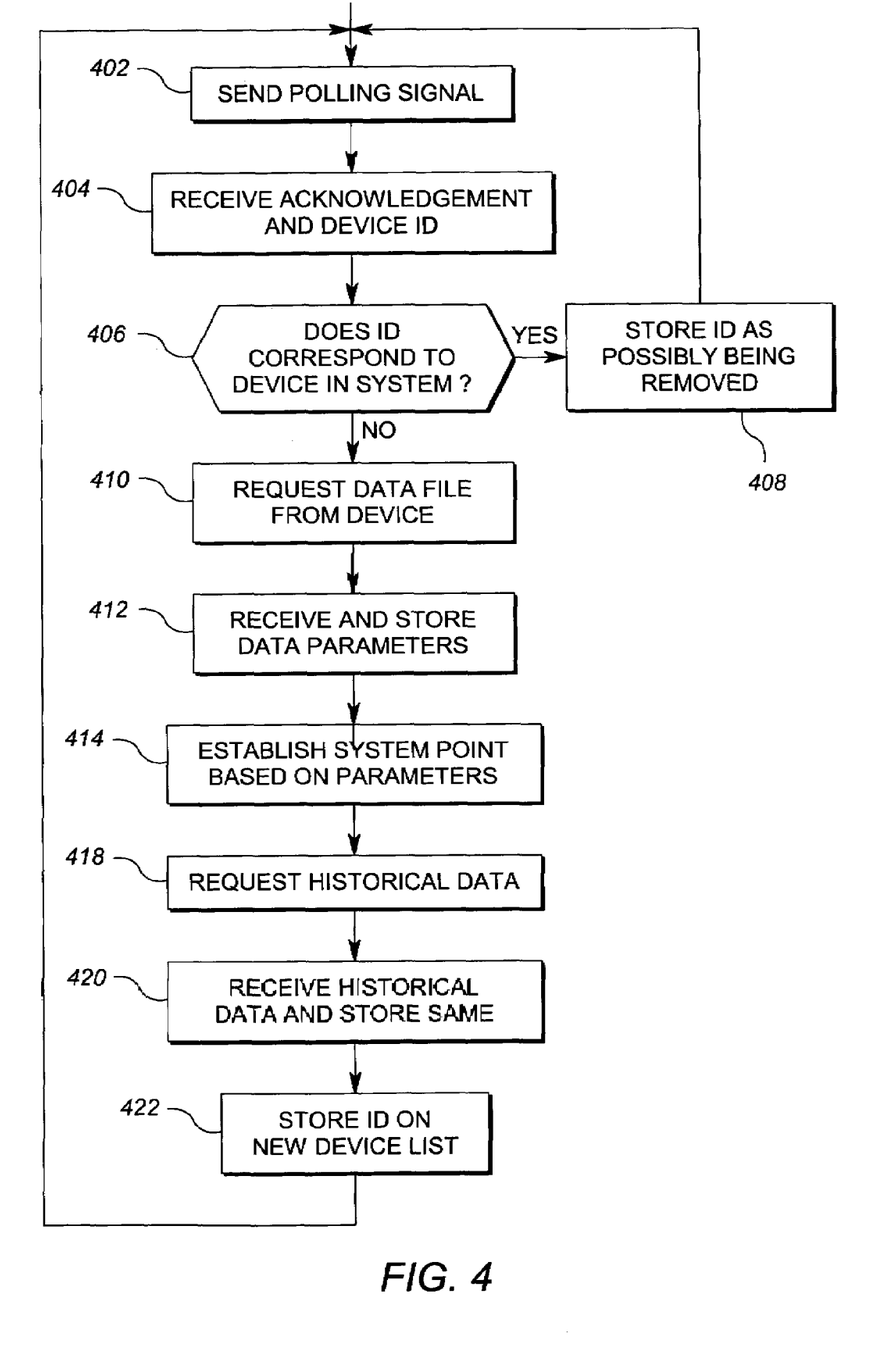
FIG. 4 shows a flow diagram of an exemplary set of operations performed to receive a new movable object information device into the exemplary arrangement of FIG. 2.
Figure 5:
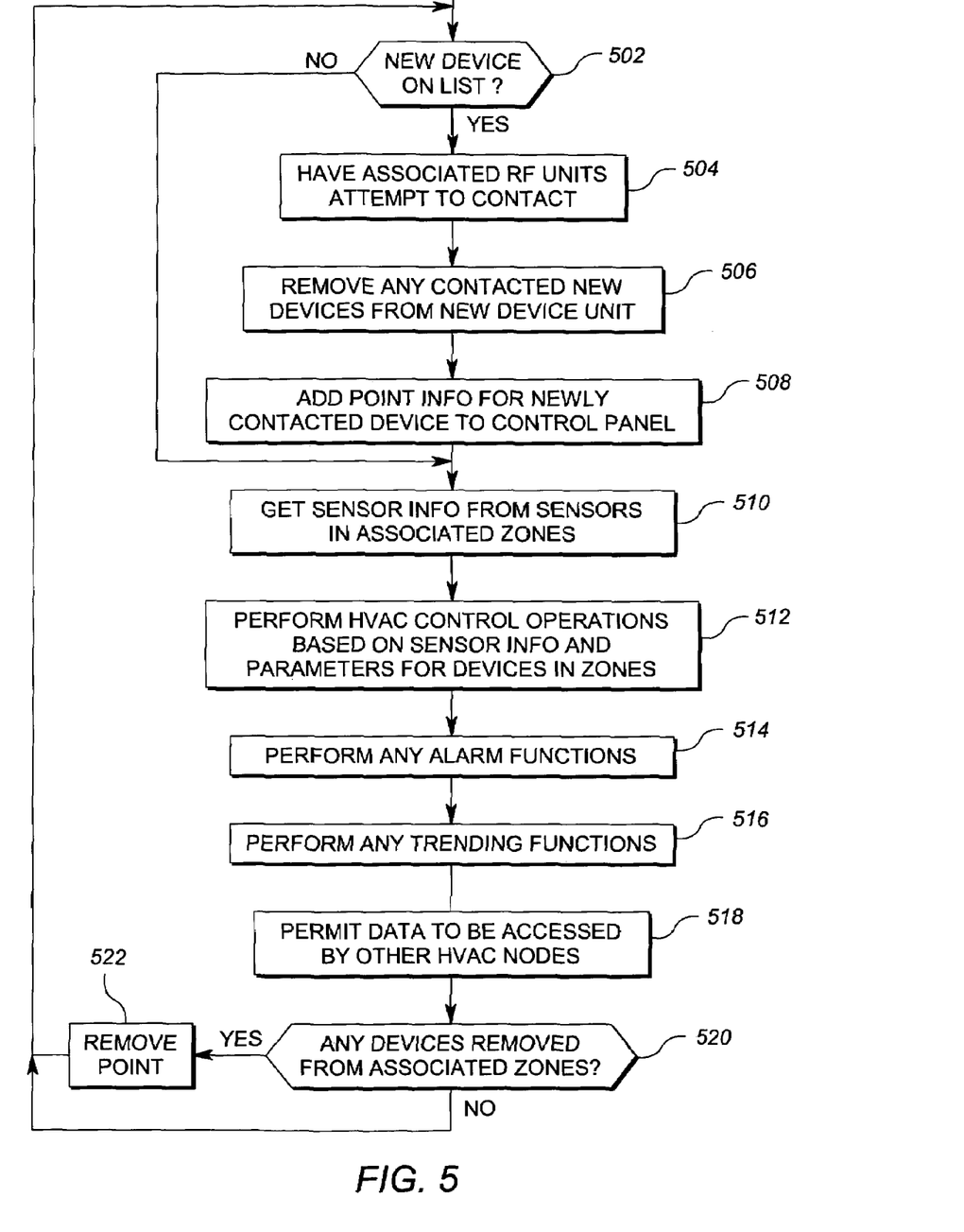
FIG. 5 shows a flow diagram of an exemplary set of operations performed by the exemplary arrangement of FIG. 2.

The processing circuit 604 is preferably operable to carry out at least some control operations related to the connected building control devices. Such operations constitute the traditional operations of a building control system field panel device and are not discussed herein in detail. The processing circuit 604 is further operable to implement similar types of control operations using information received from movable objects that are not permanent parts of the building control system. As discussed herein, the processing circuit 604 performs control operations based on threshold limits and/or sensor information received from information devices 206 associated with the movable objects. FIGS. 4 and 5 show operations that may be controlled by one or more control panels according to some embodiments of the invention.

In the remaining description of the drawings, the control panels 252, 254 and 256 may be assumed to have a structure reasonably similar to that of the field panel of 600. Referring again to FIG. 2, the control panels 252, 254 and 256 of the embodiment described herein are configured to receive data from the information devices 206 through the facility RF units 230, 232, 234, 236, 238, 240 and 244, as well as other sensors, other control panels, and possibly a master control station 258. The master control station 258 is a work station computer or control panel that provides advanced interface to the HVAC system. The master control station 258 is operably connected to each of the control panels 252, 254 and 256. The master control station 258 may suitably be an INSIGHT™ Workstation or TALON™ Network Manager available from Siemens Building Technologies, Inc.

In the particular embodiment described herein the control panel 252 is operably coupled to communicate information with the facility RF units 230 and 232, disposed in zones 205 and 208, respectively. The control panel 252 may suitably be wired directly to the RF units 230 and 232 or may be configured with an RF unit to communicate using RF signals. In a similar manner, the control panel 254 is operably coupled to communicate information with the facility RF units 234 and 236, disposed in zones 210 and 212, respectively, and the control panel 256 is operably coupled to communicate information with the facility RF units 234 and 236, disposed in zones 214 and 216, respectively. The control panels 252, 254 and 256 are operably coupled to communicate with each other and with the master control station 258 via a building network 260.

The control panel 252 is furthermore operably coupled to control the ventilation dampers 218 and 220. The ventilation dampers 218 and 220 control the flow of cooled or heated air into the zones 205 and 208, respectively. The control panel 252 is configured to cause the ventilation dampers 218 and 220 to be further opened or closed to adjust the temperatures in their respective zones. It will be appreciated that because zones 205 and 208 (and zones 210 and 212) are located in the same open space, the increase of warm or cool air flow into any of the zones 205, 208, 210 and 212 can affect the temperature in others of the zones 205, 208, 210 and 212. Nevertheless, each of the dampers 218, 220, 222, 224, 226 and 228 affects the air temperature most directly in, respectively, the zones 205, 208, 210, 212, 214 and 216.

Similar to the control panel 252, the control panel 254 is operably coupled to control the ventilation dampers 222 and 224, which control the flow of cooled or heated air into the zones 210 and 212, respectively. The control panel 256 is operably coupled to control the ventilation dampers 226 and 228, which control the flow of cooled or heated air into the zones 214 and 216, respectively.

In general operation, movable objects 202 are from time to time moved into the facility through the entry point 242. They are stored for a while, and then moved back out through the entry point 242. Thus, the facility 204 may suitably be a holding/storage facility in a supply chain. In other embodiments, there may be several entry/exit points.

In the operation of the embodiment described herein, as each movable object 202 enters the facility 204 through the entry point 242, its corresponding information device 206 is detected and registered into the system via the facility entry RF unit 244. The entry RF unit 244 stores the particulars from the information device 206 such that they are accessible by nodes (i.e. control panels 252, 254, 256 and control station 258) on the building network 260. In one example, the entry RF unit 244 is operable to retrieve the particulars from the information device 206 and store those particulars in the control panel 252. Further detail regarding this process is provided below in connection with FIG. 4. The particulars will typically include any environmental threshold limits (i.e. temperature limits, humidity limits), a unique ID value of the information device 206, and any expiration date. By way of example, the particulars obtained through the RF unit 244 may suitably include those of the data file of the memory 314 discussed above in connection with FIG. 3.

Each movable object 202 is then placed to rest in one of the zones 205, 208, 210, 212, 214 and 216. Each of the control panels 252, 254 and 256 then attempts to "find" the new movable object 202 by attempting to contact the corresponding information device 206 through the facility RF units 230, 232, 234, 236, 238 and 240. Once the new movable object 202 is "found" by an RF unit, it is identified with a zone. In this example, assume that the new movable object 202 is "found" or located by the facility RF unit 234, which indicates that the new movable object 202 is disposed in the zone 210. FIG. 5 shows an exemplary set of operations performed by a control panel such as the control panel 252 to attempt to find new movable objects. Preferably, then, each movable object 202 is associated with one of the zones 205, 208, 210, 212, 214 or 216 soon after it is moved into or within the facility 204.

Each control panel 252, 254 and 256 then obtains information from each of the information devices 206 and attempts to control the temperature within the corresponding zones in accordance with 1) the thresholds of each object within the zone and/or group of zones in one open area, and 2) the sensor values for temperature from information devices 206 within the corresponding areas.

As discussed above, it is not always possible or efficient to maintain significantly different temperatures in zones that constitute a single open space. For example, it is not always possible to maintain vastly different temperatures in zones 205, 208, 210 and 212, nor in 214 and 216. Thus, any temperature control within a zone must be tempered by information regarding the surrounding zones that make up same open area of the facility 204. To this end, the control panels 252, 254 and 256 share information received from their connected facility RF units 230, 232, 234, 236, 238 and 240. Nevertheless, small temperature adjustments may be controlled on local level.

FIG. 4 shows an exemplary set of operations performed by the control panel 252 with the entry RF unit 244 when a movable object 202 is initially moved into the facility through the entry point 242. The operations of FIG. 4 check new movable objects 202 and/or their information devices 206 into the building control system for the facility 204. In general, the control panel 252 causes the entry RF unit 244 to send out a general polling signal in step 402. The general polling signal is preferably a periodic beacon signal. The information devices 206 are configured to send an acknowledgement if the beacon is received. The entry RF unit 244 is preferably configured such that any information device 206 passing through the entry point 242 will receive the beacon signal and respond, but information devices 206 already stored in the facility will not generally receive the signal. Thus, the entry RF unit 244 may employ a directional antenna or the like, not shown but known in the art, the covers the area of ingress and egress in the entry point 242 but not the general interior of the facility 204.

The control panel 252 does not proceed to step 404 until it receives an acknowledgement signal from an information device 206. In step 404, the control panel 404 receives the unique ID from the information device 206 of the new movable object 202 (and through entry RF unit 244). In step 406, the control panel 252 determines if the ID corresponds to an information device 206 that has already been received into the facility 204. If so, then it is possible that the information device 206 is actually being removed from the facility 204, not into the facility. In such a case, the control panel 252 in step 408 stores information indicating that the information device 206 may be leaving the facility 204, and thereafter returns to step 402. If, however, it is determined in step 406 that the ID does not correspond to any information devices 206 in the system, then control panel 252 proceeds to step 410 to begin the registration process.

In step 410, the control panel 252 requests the data file from the memory element 314 of the information device 206. As discussed above, the data file will contain any threshold limits for temperature, humidity, gas exposure, or the like. In the exemplary embodiment described herein, the threshold limits relate only to temperature. In step 412, the control panel 252 receives the requested data file from the information device.

Thereafter, in step 414, the control panel 252 (or the work station 258) sets up a system entity or point for the information device. A point is an element of a building control system that is typically associated with a value pertinent to building control, such as a temperature sensor, a flow sensor, a ventilation damper actuator, etc. Building control systems typically have "points" or other similar system entities that correspond to data generating or data consuming physical devices. Thus, in step 414, the information device 206 is effectively being "added" to the building control system.

In particular, the information device 206 is registered as a point or entity that generates sensor values (e.g. temperature sensor values in the embodiment herein) and furthermore has alarm limits (the environmental thresholds). The parameters of the newly defined point are provided by the data file of the information device 206, which, as discussed further above, identifies all of the active sensing devices and the thresholds of the information device 206. Information regarding the newly established point is stored locally in the control panel 252 at least until the information device 206 is placed within the facility 204 and located by one of the facility RF units 242.

In step 418, the control panel 252 also requests the exceedence history of the information device 206. As discussed above, the memory element 314 of the information device 206 preferably also stores information identifying 1) how many times environmental thresholds have been exceeded, 2) the overall duration of the exceedence events. Obviously, such information may take any number of formats. In step 420, the control panel 252 receives this information from the information device and stores the information in such a manner that it is associated with the newly created point. Such information may be used to reduce liability of the owner's of the facility 204 for damaged goods because it will document situations in which the goods were exposed to poor conditions prior to delivery to the facility 204.

Thereafter, in step 420, the control panel 252 receives the exceedence history information from the information device 206, via the entry RF unit 244. Such information is preferably stored in a data file within the building control system, such as within the control panel 252 or the control station 258.

Thereafter, in step 422, the control panel 252 stores the ID of the new information device 206 on a new device list that is accessed by the control panels 252, 254 and 256 in the operations of FIG. 5, discussed further below. The control panel 252 then communicates the new device list from time to time to the other control panels 254 and 256 and to the control station 258.

It will be appreciated that most of the operations of FIG. 4 are specific to the embodiment of the invention described herein, and do not correspond to existing HVAC system operations. As a consequence, while the operations may be implemented in whole or in part in a control panel, it may be preferable to implement the above described processing functions of FIG. 4 at least in part within a processing device of the entry RF unit 244, instead of the control panel 252. It may be preferable to use the entry RF unit 244 because if the invention is implemented in an existing HVAC system, the preexisting control panel 252 may not have the required flexibility to carry out many or all of the above described operations. To this end, the entry RF unit 244 may itself include a programmed processing circuit that carries out the steps described above, which then communicates the new device list and the point parameters to one or more of the control station 258 and the control panels 252, 254 and 256.

FIG. 5 shows an exemplary set of operations that may be performed by a field control panel such as the control panels 252, 254 and 256 to effectuate temperature control of the facility 204. In the embodiment of FIG. 2, each of the control panels 252, 254 and 256 carries out the operation of FIG. 5. However, as also discussed above, at least some of the steps described below may be carried out by the master control station 258. As will be seen below, the steps of FIG. 5 are repeated in a repeating, ongoing manner.

In step 502, the control panel first determines whether there are any new devices on the new device list. In particular, as discussed above in connection with step 422 of FIG. 4, the ID of newly received movable objects 202 are added to a new device list that is transferred from time to time to each control panel. In step 502, the control panel checks to see if there are new devices on the list to try to locate. If so, then the control panel proceeds to step 504. If not, then the control panel proceeds to step 510.

In step 504, the control panel causes each facility RF unit to which it is connected to attempt to contact the information device 206 having an ID matching those on the new device list. For example, the control panel 252 would cause the facility RF units 230 and 232 to try to contact information devices 206 on the new device list. Because each RF unit 230, 232, 234, 236, 238 and 240 typically can only communicate with information devices 206 located within, or very nearly within, their respective zones, a facility RF unit that contacts an information device 206 on the new device list has "located" the new information device 206.

In step 506, if one of the facility RF devices of the control panel "locate" the new information device 206, then the ID of the located device is removed from the new device list and the updated new device list is provided to the other control panels. Thus, for example, if the control panel 252 successfully contacts an information device 206 from the new device list through the RF unit 232, then the control panel 252 updates the new device list by removing the information device 206 from the list, and then provides the updated new device list to the control panels 254 and 256. Then, in step 508, any new devices located by the control panel become points that are monitored by that control panel. Thus, continuing with the above example, the control panel 252 would then obtain the point parameter information and start to monitor the newly-located information device 206 as one of its points.

It will be appreciated that determining the location of an information device 206 or corresponding movable object 202 may be carried out with various degrees of sophistication using radio frequency location devices. For example the RF units 230, 232, 234, 236, 238 and 240 and the control panel 252 may cooperate with the information device 206 to locate one the information device using the techniques taught in U.S. patent application Ser. No. 10/953,031, filed on Sep. 29, 2004 entitled "Position Detection for Automated Building Control Components", as well as in U.S. patent application Ser. No. 11/206,573, entitled "Portable Wireless Sensor for Building Control" filed on Aug. 17, 2005, both of which are incorporated herein by reference.

Referring again generally to the embodiment described herein, in step 510, the control panel obtains sensor values from all information devices corresponding to each of its associated zones. A control panel is associated with a zone if it is connected to the respective facility RF unit of the zone. Thus, for example, the control panel 252 in step 510 would obtain sensor values from all information devices 206 located in or near the zones 205 and 208, which have respective facility RF units 230 and 232. Those information devices 206 of the associated zones of a control panel are identified through the location process of steps 504-508, discussed above. If the zone further includes other permanent sensor devices of the building control system, for example, installed on the walls or ceilings, then the control panel also obtains those sensor values.

In step 512, the control panel controls the ventilation dampers corresponding to each of its associated zones based on the sensor values obtained in step 510, the threshold parameter values for the information device 206 within its associated zones, and other information. Thus, for example, the control panel 252 in step 512 controls the ventilation dampers 218 and 220 to adjust the temperature generally within the zones 205 and 208, based on the temperature sensor values, as well as the threshold levels, from the information devices 206 within the zones 205, 208. As discussed above, complete local control of temperature is not always feasible. As a consequence, the control panel 252 may control the ventilation dampers 218 and 220 based also in part on sensor values from other zones of the same open space, such as in zones 210 and 212. Such information may be communicated from the control panel 254.

In any event, in step 514, the control panel determines whether an alarm condition exists for any of the information devices 206 in its associated zones. An alarm condition exists if the temperature sensor value from an information device 206 is not within the threshold boundaries for that device. If an alarm condition exists, it may be communicated to the control station 258 or other nodes on the building network. As is known in the art, the control station 258 may communicate the alarm condition to a human operator so that immediate steps may be taken to correct the alarm condition.

For example, if a sensed temperature is too high, and a technician is alerted to the situation, the technician may perform any number of corrective steps. For example, the technician may determine whether any other sensor values from the same area show the same temperature values. If not, then the sensor that generated the alarm condition may be inaccurate. If multiple devices show consistent temperature values that caused the alarm condition, then there is an indication that the control operations of step 512 are insufficient to maintain the proper temperature. In such a case, the technician may undertake to force more cool air into the area, or even cause certain movable objects 202 to be moved to a cooler area of the facility 204.

In step 516, the control panel may perform trending, or in other words, statistical tracking operations, on the sensor information for the various points received in step 510. Trending operations in building control systems are known in the art, and typically include a data value history for a point over multiple measurements, hours, days or longer. In accordance with the embodiment described herein, trending of conditions of individual movable objects 202 may be made. These trending values may be used as documentation of the conditions of the facility 204 when the movable objects 202 were located within the facility 204.

In addition to or instead of trending, the control panel may perform other useful operations such as totalization. By way of example, the control panel may totalize the amount of time a particular device has been at a particular state or above a certain value. Such totalization may be in addition to, or as a complement to, one or more of the alarming functions. By way of example, the totalizer may determine how much time a particular food or medical item has spent above a particular temperature. While the total amount of time may not be sufficient to generate an alarm, the data is useful because future handling operations may be modified in response to the total. Such totalization functions may be instead performed by the information devices 206 themselves, with totalization values periodically communicated to the control panel.

Referring again to the general discussion of FIG. 5, in step 518, the control panel allows access to the data generated by the sensors on the information devices 206 registered to the control panel in the same manner as ordinary building control point data is accessed at the control panel. Such access may be through a local UI on the control panel, not shown, by a portable terminal that attaches to the control panel, or by communicating the information to another control panel or the work station 258. The information that is made available may be the sensor value received from any information device 206, the alarm thresholds for the information device, and trending or alarm information for the point associated with any information device.

In step 520, the control panel determines whether any information devices 206 registered to the control panel have been removed from the local zones. If the control panel does not receive a sensor value from an information device 206 after one or more repetitions of step 510, then the control panel determines that the information device 206 has been removed from the area covered by the notifying control panel. In such a case, the control panel in step 522 notifies the other control panels that the information device 206 has been removed from the area covered by the notifying control panel. All of the control panels may treat the "missing" information device 206 as a device on the new device list. If a new control panel "finds" the information device 206, the point associated with the information device 206 may be transferred to the new control panel. However, if the "missing" information device 206 coincides with a device 206 detected by the entry RF unit 244 as possibly being removed from the facility in step 408, then the system may suitably treat the information device 206 as being removed from the facility 204. The point is removed from the control panel and any data regarding the point is archived via the control station 258.

In any event, after step 522, the control panel returns to step 502 to repeat the process. Similarly, if it is determined in step 520 that no devices were removed from the zones associated with the control panel, then the control panel proceeds directly to step 502 to repeat the process.

It will be appreciated that the operations of FIG. 5 (and FIG. 4) may be performed in any number of other sequences.

In general, the above embodiment illustrates examples of several ways information devices on movable objects may be used to monitor, control and track the condition of devices brought into a facility. By temporarily registering the information devices of the movable objects as data elements of a building control system, all of the resources of the building control system may be made available to perform such monitoring, controlling and/or tracking.

In other embodiments, the location and monitoring of environmental conditions can occur in three dimensions. In particular, because storage facilities can exceed 35 feet in height, there is a potential for significant temperature variance at different vertical levels of the same floor space. In such a case, additional zones may be defined based on vertical location as well as horizontal location. For example, the zone 205 of FIG. 2 may be divided into three zones, each comprising a different vertical space. Vertical location may be carried out by placing facility RF units (e.g. facility RF unit 230) at each of the vertical zone locations. Alternatively, the position detection techniques of U.S. application Ser. No. 10/953,031 may be employed for this purpose.

It will be appreciated that the above described embodiments are merely exemplary, and that those of ordinary skill in the art may readily devise their own implementations that incorporate the principles of the present invention and fall within the spirit and scope thereof.

I claim:

1. An arrangement for maintaining an environment for a movable object comprising:
an information device including a memory element and a first radio frequency (RF) element, the memory element disposed in a substantially fixed relationship with the movable object such that the memory element remains in a vicinity of the movable object when the movable object is moved, the memory including at least one parameter having information identifying at least one threshold for an environmental condition, the first RF element operably coupled to the memory element to receive the at least one parameter therefrom, the first RF element operable to modulate a parameter signal containing the at least one parameter onto an RF signal for transmission; and
a second RF element fixedly disposed in the vicinity of a structure, the second RF element operable to receive the RF signal from the first RF element when the movable object is in the vicinity of the structure; a building control system controller operably coupled to the second RF element to receive the at least one parameter from the RF signal, the building control system controller operable to alter at least one building control system output based at least in part on the at least one parameter, to alter an environmental condition within the structure, wherein said movable object comprises one or more products.

2. The arrangement of claim 1, wherein the information device further includes a sensor operable to sense at least one environmental condition in the vicinity of the movable object.

3. The arrangement of claim 2, wherein the sensor comprises a microelectromechanical (MEMs) sensor device.

4. The arrangement of claim 3, wherein the sensor comprises a MEMs temperature sensor.

5. The arrangement of claim 4, wherein the information device further includes a humidity sensor.

6. The arrangement of claim 2, wherein the building control system controller is further operable to receive sensor information regarding the at least one environmental condition from the sensor, and the building control system controller is further operable to alter the at least one building control system output based at least in part on the sensor information.

7. The arrangement of claim 1, wherein the information device is configured to be attached to packaging for the one or more products.

8. The arrangement of claim 1, wherein the building control system controller is further operable to receive sensor information regarding an environmental condition in the vicinity of the object, and the building control system controller is further operable to alter the at least one building control system output based at least in part on the sensor information.

9. The arrangement of claim 1, wherein the at least one parameter including information identifying the at least one threshold for an environmental condition includes information identifying a temperature threshold.

10. The arrangement of claim 1, wherein the at least one parameter including information identifying the at least one threshold for an environmental condition includes information identifying a humidity threshold.

11. The arrangement of claim 1, wherein the memory element is further operable to store an expiration date for the product.

12. The arrangement of claim 1, wherein the building control system controller is operably coupled to receive the at least one parameter from the second RF device via another building control system controller.

* * * * *